United States Patent [19]

Udagawa

[11] Patent Number: 5,259,629
[45] Date of Patent: Nov. 9, 1993

[54] STEEL LAMINATE GASKET WITH DOWEL ENGAGING DEVICE

[75] Inventor: Tsunekazu Udagawa, Ichikawa, Japan

[73] Assignee: Ishikawa Gasket Co., Ltd., Tokyo, Japan

[21] Appl. No.: 657,060

[22] Filed: Feb. 19, 1991

[51] Int. Cl.5 .............................................. F16J 15/32
[52] U.S. Cl. ............................... 277/235 B; 277/9.5; 277/189; 277/236
[58] Field of Search ........... 277/235 R, 235 A, 235 B, 277/9, 9.5, 181, 189, 256

[56] References Cited

U.S. PATENT DOCUMENTS

| | | |
|---|---|---|
| 2,321,157 | 6/1943 | Rees . |
| 2,439,306 | 4/1948 | Lajdley ............................ 277/189 |
| 2,587,405 | 2/1952 | Stevens et al. ..................... 277/181 |
| 3,332,141 | 7/1967 | Hopp ................................... 277/9 |
| 4,524,979 | 6/1985 | Bauder ........................... 277/235 B |
| 4,648,607 | 3/1987 | Yamada et al. ................. 277/235 B |
| 4,776,601 | 10/1988 | Yamada ........................ 277/235 B |
| 5,000,464 | 3/1991 | Yasui ............................ 277/235 B |
| 5,087,801 | 3/1992 | Okano et al. ................... 277/235 B |

Primary Examiner—William A. Cuchlinski, Jr.
Assistant Examiner—Daniel G. DePumpo
Attorney, Agent, or Firm—Kanesaka and Takeuchi

[57] ABSTRACT

The steel laminate gasket is installed between two engine parts. One of the engine parts is provided with at least two positioning pins for setting a location of the gasket. The gasket comprises at least first and second plates. The first plate includes at least first and second holes formed at portions corresponding to the positioning pins, and a plurality of slits formed at an inner portion around the first hole. The diameter of the first hole is at least partly smaller than the diameter of the positioning pin. The second plate is situated above the first plate and is connected thereto. The second plate includes third and fourth holes corresponding to the first and second holes, respectively. The third hole is larger than the first hole. When the gasket is pushed over the positioning pins, the inner portion around the first hole bends and engages the positioning pin to securely connect the gasket to the engine block.

6 Claims, 1 Drawing Sheet

STEEL LAMINATE GASKET WITH DOWEL ENGAGING DEVICE

BACKGROUND OF THE INVENTION AND RELATED ART STATEMENT

The present invention relates to a steel laminate gasket for an internal combustion engine with a dowel engaging device, which can be securely attached to dowels on an engine block.

When engine parts are assembled with a gasket, a lower engine part is placed on a floor or a platform. Since the lower engine part is provided with dowels for setting a location of the gasket, the gasket is placed on the lower engine part so that the dowels are located in dowel holes of the gasket. Then, an upper engine part is placed above the gasket, and the two engine parts are tightened together by bolts.

In order to easily assemble the gasket on the lower engine part, the diameter or size of the dowel hole of the gasket is slightly larger than the diameter of the dowel. Therefore, in case the lower engine part with the gasket is shaken, the gasket may disengage from the lower engine part.

Especially, in a V engine, gasket attaching surfaces of the lower engine part inclines downwardly. Therefore, even if gaskets are installed on the gasket attaching surfaces of the lower engine part, the gaskets are liable to disengage from the lower engine part.

In an automatic assembly line of engines, engines are continuously or consecutively moved. When the upper engine part is assembled on the lower engine part with the gasket, in some cases, the engine parts are stopped for a while for assembly.

In the V engine, in case the lower engine part with the gasket is consecutively moved and stopped, the gasket may fall from the lower engine part. In the automatic assembly line, it is troublesome to check the gasket in each engine, and install a gasket in case no gasket is placed on the lower engine part.

In a gasket, there has not been made any device for preventing the gasket from disengaging from an engine part.

Accordingly, one object of the present invention is to provide a steel laminate gasket having a dowel engaging device to prevent the gasket from accidentally disengaging from the engine part.

Another object of the invention is to provide a steel laminate gasket as stated above, which can be easily installed on the engine without affecting efficiency of the engine.

A further object of the invention is to provide a steel laminate gasket as stated above, which can be easily and economically manufactured.

Further objects and advantages of the invention will be apparent from the following description of the invention.

SUMMARY OF THE INVENTION

In accordance with the present invention, the steel laminate gasket is installed between two engine parts. One of the engine parts is provided with at least two positioning pins or dowels for setting a location of the gasket.

The gasket basically comprises a first plate and a second plate situated above the first plate. The first plate includes at least first and second holes formed at portions corresponding to the positioning pins on the engine part, and a plurality of slits formed at an inner portion around the first hole to extend outwardly from the first hole. The diameter of the first hole is at least partly smaller than a diameter of the positioning pin.

When the first and second holes are aligned with the positioning pins and the first plate is urged or pushed against the engine part with the positioning pins, the inner portion around the first hole deforms or bends. Accordingly, the positioning pin can enter into the first hole and engage together to thereby prevent the first plate from easily disengaging from the engine part.

The second plate is provided with third and fourth holes at portions corresponding to the first and second holes. The third hole has a diameter larger than the inner portion around the first hole. Therefore, in case the inner portion is bent toward the second plate when the positioning pin is inserted into the first hole, the inner portion is located in the third hole and does not affect the second plate.

The first and second plates are connected together in a conventional method, such as welding or grommet partly covering the first and second plates. Therefore, the gasket, i.e. first and second plates, does not disengage from the engine block when installed. In the gasket of the invention, other plates may be installed under the first plate or above the second plate to form a steel laminate gasket with three or more plates.

Each slit of the first plate may have a V shape to open toward the first hole. Also, the inner portion of the first plate may be bent in advance so that the diameter of the first hole does not exceed the diameter of the positioning pin. As a result, the gasket can be easily engaged with the positioning pins when installed.

The second and fourth holes and their vicinities may be formed as in the first and the third holes and their vicinities, respectively. As a result, the two positioning pins firmly engage the gasket.

DETAILED DESCRIPTION OF PREFERRED EMBODIMENTS

Figure 1:
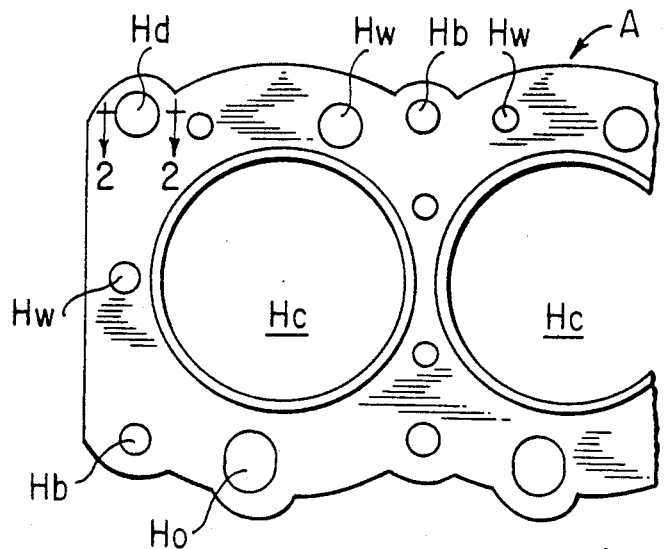
FIG. 1 is a plan view of a part of a first embodiment of a gasket of the preset invention.
Figure 2:
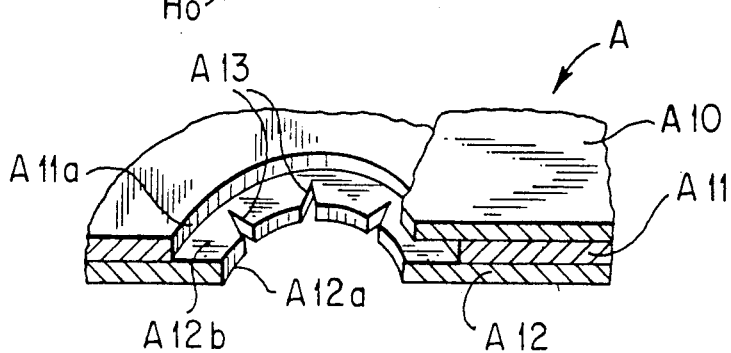
FIG. 2 is an enlarged perspective section view taken along line 2—2 in FIG. 1.
Figure 3:
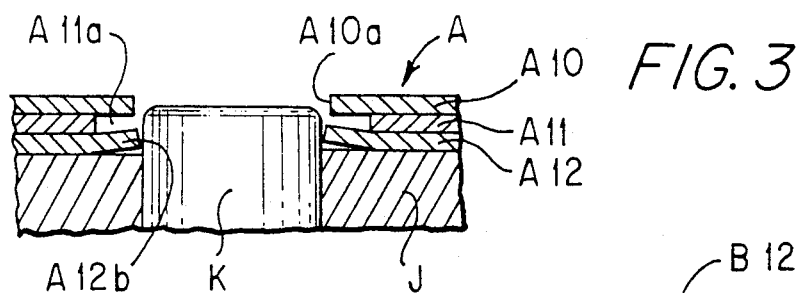
FIG. 3 is a section view for showing the gasket installed on a lower engine part.

Referring to FIGS. 1—3, a first embodiment A of a steel laminate gasket of the invention is shown. The gasket A is a cylinder head gasket and is provided with a plurality of cylinder bores Hc, water holes Hw, oil holes Ho, bolt holes Hb, and positioning pin or dowel holes Hd as in the conventional gasket. Since the present invention is directed to the structure of the dowel holes Hd, other structure and sealing mechanisms are not explained. Any structure and sealing mechanisms may be used.

As shown in FIG. 3, the gasket A of the invention is designed to be installed on a cylinder block J with a dowel K. The dowel slightly projects upwardly from an upper surface of the cylinder block J.

The gasket A comprises an upper plate A10, a middle plate A11, and a lower plate A12. The upper plate A10 extends substantially the entire area of the gasket A and includes a hole A10a having a diameter equal to or slightly larger than the diameter of the dowel K. The middle plate A11 is situated under the upper plate A10 and includes a hole A11a larger than the hole A10a.

The lower plate A12 is situated under the middle plate A11 and extends substantially the entire area of the gasket. The lower plate A12 includes a hole A12a having a diameter slightly smaller than the dowel K, and an inner portion A12b around the hole A12a. In the inner portion A12b, a plurality of V shape notches or slits A13 is formed at a predetermined interval to surround the hole A12a.

The hole A11a of the middle plate A11 substantially corresponds to the inner portion A12b. Namely, the V shape notches are located within the hole A11a.

When the plates A10, A11, A12 are assembled together, the plates A10, A11, A12 are connected together by spot welding (not shown). In case a grommet or a cover member for holding the upper and lower plates is used, the plates need not be connected by spot welding.

When the gasket A is installed on the cylinder block J, the gasket A is placed above the cylinder block J so that the dowels K align the holes A12a. Then, the gasket A is strongly pushed against the cylinder block J. As a result, the inner portion A12b, i.e. strips between the notches A13, bends to allow the dowels K to enter into the holes A12a.

Since the middle plate A11 has the hole A11a larger than the inner portion A12b, when the inner portion A12b deforms or bends, the inner portion A12b is urged to partly locate inside the hole A11a. The deformation of the inner portion A12b does not affect the other plates.

Generally, the two dowels are formed on the cylinder block J. When the dowels K enter into the holes A12a, edges of the inner portions A12b engage the dowels K. Therefore, the gasket A does not move nor disengage from the cylinder block J.

Figure 4:
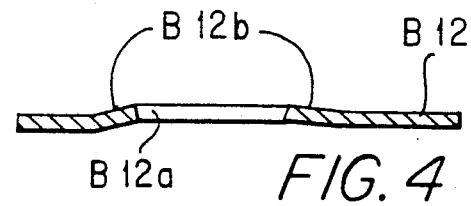
FIG. 4 is a section view of a part of a plate for constituting a second embodiment of the invention.

FIG. 4 shows a plate B12 to be used as a second embodiment B of the gasket. The gasket B is almost the same as the gasket A. The difference is that an inner portion B12b, i.e. strips between notches which is the same as the notches A13, is provisionally bent upwardly when the plate B12 is formed. The diameter of a hole B12a after the inner portion B12b is bent is still smaller than the diameter of the dowel K. The rest of the structure is the same as the gasket A.

In the gasket B, since the strips between the notches are bent in advance, it is easy to place the gasket B in a proper position. Further, large force is not required when the gasket B is installed on the cylinder block.

Figure 5:
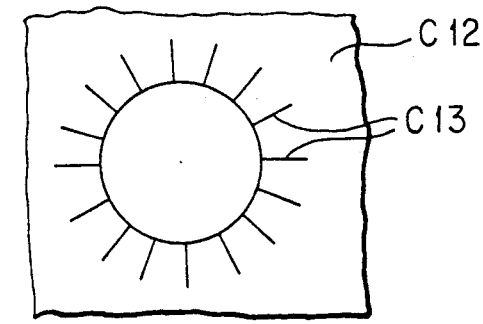
FIG. 5 is a plan view of a part of a plate for constituting a third embodiment of the invention.

FIG. 5 shows a plate C12 to be used as a third embodiment C of the gasket of the invention. The gasket C is almost the same as the gasket A. The difference is that slits C13 are formed on a lower plate C12 instead of the V shape notch A13 on the plate A12. The rest of the structure is the same as the gasket A. The gasket C operates as in the gasket A.

Figure 6:
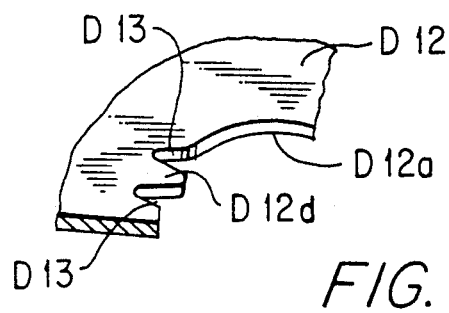
FIG. 6 is a perspective section view of a part of a plate for constituting a fourth embodiment of the invention.

FIG. 6 shows a plate D12 to be used as a fourth embodiment D of the gasket of the invention, which is used instead of the plate A12. The rest of the structure of the gasket D is the same as the gasket A. The plate D12 has a flap D12d between two notches or slits D13, which slightly extends into a hole D12a. Therefore, when the gasket D is installed on the cylinder block, the flap D12d bends and engages the dowel K to securely attach the gasket D on the cylinder block.

In the steel laminate gasket of the present invention, one of the plates is provide with a hole smaller than the dowel, and a plurality of slits. When the gasket is pushed over the dowel, portions with slits around the hole bend to securely engage the gasket to the engine block. Therefore, even if the engine block is transferred in an assembly line, the gasket does not accidentally disengage from the engine block.

While the invention has been explained with reference to the specific embodiments of the invention, the explanation is illustrative, and the invention is limited only by the appended claims.

What is claimed is:

1. A steel laminate gasket adapted to be installed between two engine parts and having an upper surface, one of the engine parts having at least two positioning pins with predetermined sizes, said positioning pins setting a location of the gasket, comprising, a first metal plate having at least first and second holes formed at portions corresponding to the positioning pins on the engine part, said first hole having a size at least partly smaller than the predetermined size of the positioning pin, an inner portion formed around the first hole and having an edge around the first hole, and a plurality of slits formed only within the inner portion to extend outwardly from the edge, said slits being substantially equally spaced apart from each other to divide the inner portion, said edge being separated into a plurality of edge sections by the slits so that when the first hole is aligned with the positioning pin and the first plate is urged against the engine part with the positioning pins, at least one edge section forming the small size for the first hole deforms to allow the positioning pin to enter into the first hole and the at least one edge section only abuts against and engages the positioning pin to thereby prevent the first plate from easily disengaging from the engine part, and a second metal plate situated above and connected to the first plate, said second plate having third and fourth holes at portions corresponding to the first and second holes, respectively, said third hole having a size larger than the inner portion around the first hole so that the inner portion with the slits are completely located inside the third hole when said first and second plates are assembled, and in case the inner portion is bent toward the second plate when the positioning pin is inserted into the first hole, the inner portion is only located in the third hole without contacting to any other plate of the gasket while the at least one edge section forming the small size only engages the positioning pin and does not project beyond the upper surface of the gasket.

2. A steel laminate gasket according to claim 1, wherein each slit has a V shape to open toward the first hole to thereby allow the inner portion to bend easily.

3. A steel laminate gasket according to claim 1, wherein the inner portion around the first hole is bent in advance so that diameter of the first hole thus bent does not exceed the diameter of the positioning pin.

4. A steel laminate gasket according to claim 1, wherein said second hole has a size at least partly smaller than the positioning pin, said first plate further including an inner portion around the second hole and a plurality of slits formed at the inner portion to extend outwardly from the second hole so that the inner portion around the second hole engages the positioning pin, and said fourth hole having a size larger than the inner portion around the second hole.

5. A steel laminate gasket according to claim 1, wherein said slits extend radially outwardly from the first hole, and the edge around the first hole entirely engages the positioning pin.

6. A steel laminate gasket adapted to be installed between two engine parts and having an upper surface, one of the engine parts having at least two positioning pins with predetermined sizes, said positioning pins setting a location of the gasket, comprising, a first metal plate having at least first and second holes formed at portions corresponding to the positioning pins on the engine part, an inner portion formed around the first hole and having an edge around the first hole, and two slits formed only within the inner portion to extend outwardly from the edge of the first hole, a portion surrounded by the two slits forming a flap and an edge of the flap having a size smaller than the predetermined size of the positioning pin so that when the first hole is aligned with the positioning pin and the first plate is urged against the engine part with the positioning pins, the flap at the inner portion deforms in the direction away from the positioning pin to allow the positioning pin to enter into the first hole and the positioning pin only abuts against and engage the edge of the flap of the inner portion to thereby prevent the first plate from easily disengaging from the engine part, and a second metal plate situated above and connected to the first plate, said second plate having third and fourth holes at portions corresponding to the first and second holes, respectively, said third hole having a size larger than the inner portion around the first hole without having a notch therearound so that the flap and the inner portion are completely located inside the third hole when the first and second plates are assembled, and in case the flap of the inner portion is bent toward the second plate when the positioning pin is inserted into the first hole, the flap is only located in the third hole without extending beyond the upper surface of the gasket and the edge of the flap only contacts and abuts against the positioning pin to prevent affection to any other plate of the gasket and the engine parts.

* * * * *